United States Patent Office 3,505,456
Patented Apr. 7, 1970

3,505,456
METHOD OF TREATING AN ANIMAL SUFFERING FROM ANAPLASMOSIS AND PIROPLASMOSIS
Paul Anthony Barrett, London, England, assignor to Burroughs Wellcome & Co. (U.S.A.) Inc., New York, N.Y., a corporation of New York
No Drawing. Filed Jan. 20, 1966, Ser. No. 521,790
Claims priority, application Great Britain, Jan. 21, 1965, 2,723/65
Int. Cl. A61k 27/00
U.S. Cl. 424—323
5 Claims

ABSTRACT OF THE DISCLOSURE

A method of treatment of anaplasmosis and piroplasmosis in animals by administering a composition containing as the principal ingredient a compound of the formula

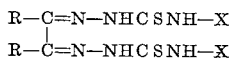

wherein R is selected from the group consisting of hydrogen, benzyl, alkyl having 1–4 carbon atoms, and hydroxymethyl, and wherein X is selected from the group consisting of methyl, ethyl and methoxymethyl. The compound is administered at dosages of 10 mg./kg. of animal weight to 30 mg./kg. of animal weight.

---

In British patent specification No. 966,849 there are described a large number of α-dithiosemicarbazone derivatives which have activity against the organism *Trichomonas vaginalis*.

It has now been discovered that the compounds of Formula I below, which comprise a small class of the compounds described in British patent specification No. 966,849 also have activity against anaplasmosis, a disease which affects cattle in certain parts of the world. Further related compounds having activity against anaplasmosis are described in British patent application No. 31,673/63.

The compounds of Formula I can be represented by:

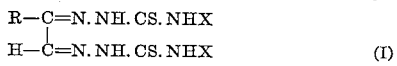
(I)

wherein R is a hydrogen atom, or a benzyl group, or an alkyl or hydroxyalkyl group of 1 to 4 carbon atoms, and X is a hydrogen atom or a methyl, ethyl, or methoxymethyl group.

The parent compound wherein R and X are both hydrogen atoms, glyoxal dithiosemicarbazone, is of relatively low activity and the preferred compounds are glyoxal di-4-methylthiosemicarbazone, glyoxal di-4-methoxymethylthiosemicarbazone, and methylglyoxal dithiosemicarbazone, methylglyoxal di-4-methylthiosemicarbazone, n-propylglyoxal dithiosemicarbazone and ethylglyoxal dithiosemicarbazone. The particularly preferred compounds are glyoxal di-4-methoxymethylthiosemicarbazone and ethylglyoxal dithiosemicarbazone.

The compounds may be prepared according to the method described in British patent specification No. 966,849 and therefore, only the melting points of some of the compounds are given in the examples of this specification.

The disease, anaplasmosis, against which these compounds show activity, is a serious systemic disease of cattle which is prevalent in large areas of the Asian, African, Australasian, and American continents and certain Southern areas of Europe which have a Mediterranean type of climate. The infecting anaplasm organism attacks the red blood cells of the cattle characteristically causing anaemia, general debility, and fever of the animal which often prove fatal. The infecting anaplasm organism has not yet been fully characterised; it may be protozoan but is believed more likely to be related to the rickettsiae. There are two species in cattle which are known as *Anaplasma marginale* and *Anaplasma centrale* the former being the more virulent. A milder form of anaplasmosis also affects sheep and goats in areas such as the Middle East, South Africa, and the United States.

According to the present invention in one aspect there is provided a method of treating animals suffering from anaplasmosis which comprises the administration of a compound of Formula I to the infected animal.

Certain of the compounds of Formula I have also been tested and found to be active against *Babesia rodhaini* in mice. For example n-propylglyoxal dithiosemicarbazone (applicants' compound reference No. 425C63), n-propylglyoxal di(4-methylthiosemicarbazone) (426C63), ethylglyoxal dithiosemicarbazone (62C61), glyoxal di(4-methoxymethylthiosemicarbazone) (241C60) and methylglyoxal dithiosemicarbazone (1136C58) all reduced the level of parasitaemia compared with controls in experimentally infected mice when the compounds were administered subcutaneously at 100 mg. of compound per kg. body weight. *B. rodhaini* is a screening organism used for detecting activity against piroplasms which infect animals of veterinary importance such as the Babesia species *B. caballi* and *B. eqin* in horses, *B. bigemina* and *B. bovis* in cattle and genuses of piroplasms such as Theileria. Thus it may reasonably be expected that the compounds will also be active against these forms of piroplasms.

Accordingly, in another aspect the present invention provides a method of treatment of animals suffering from piroplasmosis which comprises the administration of a compound of Formula I to the infected animal.

The compounds of Formula I may be presented in a pharmaceutical formulation for oral or parenteral administration. For example, the oral formulations may be tablets, capsules, granules, powder, suspension, solutions, or emulsions which may contain diluents, binding agents, dispersing agents, surface-active agents, lubricating agents, coating materials, flavouring agents. colouring agents, solvents, thickening agents, suspending agents, or other pharmaceutically acceptable additives, and these formulations may be presented in unit-dose form or multi-dose form or as additives to feed-stuffs. The injectable form may be an aqueous or non-aqueous solution, or emulsion in a pharmaceutically acceptable liquid or mixture of liquids, which may contain bacteriostatic agents, antioxidants, buffers, solutes to render the solution isotonic with the blood, thickening agents, suspending agents, or other pharmaceutically acceptable additives. Such formulations are presented in unit dose forms such as ampoules or disposable injection devices, or in multi-dose forms such as a bottle from which the appropriate doses may be withdrawn. All such formulations should preferably be rendered sterile.

Thus in another aspect the invention provides veterinary pharmaceutical formulations containing a compound of Formula I.

For the treatment of anaplasmosis in cattle a particularly preferred oral formulation containing a compound of Formula I is a drench containing a dispersable powder, are particularly preferred parenteral preparations are oily suspensions, aqueous suspensions and solutions in non-toxic organic solvents.

These may be prepared according to any of the standard techniques of pharmacy. Thus in a further aspect the present invention provides a method for preparing a veterinary pharmaceutical formulation which comprises the incorporation of a compound of Formula I into the said formulation by known techniques.

The actual dose of the compound of Formula I required for treatment will vary somewhat according to the actual compound used, the method of administration, and the size of the animal being treated.

In the treatment of anaplasmosis in cattle using one of the preferred compounds orally the smallest useful dose is 30 mg./kg. given for 3 consecutive days. Thus taking the size of a small calf as 30 kg. and the size of a very large full grown beast as 150 kg. the dose required will be in the approximate range 1 g. to 5 g. per single dose, or giving 3 doses a total dose of 3 g. to 15 g. The dose may however be considerably increased and doses of 150 mg./kg. or more up to the point where toxicity considerations become important can be used. When given parenterally the compounds are active at smaller doses and using one of the preferred compounds parenterally in cattle the smallest useful dose is 10 mg./kg. given on 3 consecutive days. Thus the minimum single parenteral dose will be in the range 300 mg. to 1.5 g. and this may be increased up to the point where toxicity considerations become important.

Thus more particularly the present invention provides pharmaceutical formulations for oral administration to cattle which contain at least 1 g. of a compound of Formula I and pharmaceutical formulations for parenteral administration to cattle which contain at least 300 mg. of Formula I.

The invention will now be described with particular reference to the following examples.

EXAMPLES

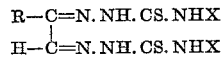

| Example No. | Applicants reference No. | R— | X— | M.P., °C. (with decomposition) |
|---|---|---|---|---|
| 1 | 960C59 | H | H | 252 |
| 2 | 79C60 | H | $CH_3$ | 253 |
| 3 | 1136C58 | $CH_3$ | H | 255 |
| 4 | 158C60 | $CH_3$ | $CH_3$ | 232 |
| 5 | 62C61 | $C_2H_5$ | H | 228 |
| 6 | 65C61 | $C_2H_5$ | $CH_3$ | 223 |
| 7 | 425C63 | n-$C_3H_7$ | H | 216 |
| 8 | 426C63 | n-$C_3H_7$ | $CH_3$ | 196 |
| 9 | 294C61 | i-$C_3H_7$ | H | 198 |
| 10 | 299C61 | i-$C_3H_7$ | $CH_3$ | 206 |
| 11 | 261C61 | n-$C_4H_9$ | H | 217 |
| 12 | 262C61 | n-$C_4H_9$ | $CH_3$ | 173 |
| 13 | 313C61 | t-$C_4H_9$ | H | 209 |
| 14 | 314C61 | t-$C_4H_9$ | $CH_3$ | 219 |
| 15 | 791C61 | $HOCH_2$ | H | 215 |
| 16 | 792C61 | $HOCH_2$ | $CH_3$ | 202 |
| 17 | 241C60 | H | $CH_3O.CH_2$ | 221 |
| 18 | 257C61 | $CH_3$ | $CH_3O.CH_2$ | 207 |
| 19 | 341C60 | H | $C_2H_5$ | 241 |
| 20 | 251C61 | $C_6H_5.CH_2$ | H | 220 |
| 21 | 252C61 | $C_6H_5.CH_2$ | $CH_3$ | 210 |

All of the above compounds are insoluble in water at room temperatures.

Example 22

An oily injection suspension of ethylglyoxal dithiosemicarbazone was prepared by incorporating the previously sterilised drug into previously sterilised arachis oil and ball milling the drug down to particle size of 50μ or less. The concentration used was 100 mg. of drug per ml. of suspension. The suspension was then put into the final container under aseptic conditions.

Example 23

A dispersible powder was made up as follows:

| | Percent by weight |
|---|---|
| Glyoxal di-(4-methoxymethylthiosemicarbazone) | 90.0 |
| Starch | 8.8 |
| Cetrimide B.P. (surface active agent) | 0.2 |
| Carbopol 934 | 1.0 |
| | 100.0 |

Carbopol 934 is a carboxyvinylpolymer thickening agent sold by Honeywell-Stein Ltd.

The drench can be prepared by weighing out the appropriate quantity of powder and adding this to water.

Example 24

An injectable solution of ethylglyoxal dithiosemicarbazone (62C61) was prepared as follows:

| | G. |
|---|---|
| Ethylglyoxal dithiosemicarbazone | 20 |
| Dimethylacetamide | 40 |
| Propylene glycol | 60 |

The drug was dissolved and the solution sterilised by filtration.

Example 25

An oily injectable suspension of benzylglyoxal dithiosemicarbazone (251C61) was prepared by sterilizing the finely divided compound using dry heat and then aseptically incorporating this into previously sterilised arachis oil.

Example 26

An aqueous injectable suspension of hydroxymethylglyoxal dithiosemicarbazone (791C61) was prepared according to the following formulation:

| | Mg. |
|---|---|
| Hydroxymethylglyoxal dithiosemicarbazone | 200 |
| Polyoxyethylene sorbitan mono-oleate | 0.2 |
| Methyl hydroxybenzoate | 1.0 |
| Water for injection to 1 ml. | |

Sterilise the active ingredient 791C61 using dry heat and incorporate into the vehicle, which has been previously sterilised by autoclaving.

Example 27

Dispersible granules of benzylglyoxal dithiosemicarbazone (251C61) were prepared as follows:

| | G. |
|---|---|
| Compound 251C61 | 120.0 |
| Starch | 42.0 |
| Carbapol 935 | 17.64 |
| Cetrimide | 0.36 |

A granular precipitate is prepared using a small quantity of strong ammonia solution and 95% ethyl alcohol.

1.5 g. of dispersible granule contain 1.0 g. of compound 251C61.

I claim:

1. A method of treating an animal suffering from anaplasmosis, which comprises administering to said animal an effective antianaplasmodial amount of a compound having the formula

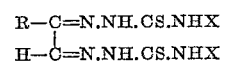

wherein R is selected from the class consisting of hydrogen, benzyl, alkyl having 1 to 4 carbon atoms, and hydroxymethyl, and X is selected from the class consisting of hydrogen, methyl, ethyl and methoxymethyl.

2. The method of claim 1 wherein the compound is administered orally in a dose of 1 g. to 5 g.

3. The method of claim 1 wherein the compound is administered parentally in a dose of 300 mg. to 1.5 g.

4. A method of treating an animal suffering from piroplasmosis, which comprises administering to said animal an effective antipiroplasmodial amount of a compound having the formula

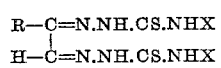

wherein R is selected from the class consisting of hydrogen, benzyl, alkyl having 1 to 4 carbon atoms and hydroxymethyl, and X is selected from the class consisting of hydrogen, methyl, ethyl and methoxymethyl.

5. The method of claim 4, wherein 100 mg. of the compound per kilogram of bodyweight of the animal is administered.

References Cited

UNITED STATES PATENTS 3,265,570   8/1966   Michaels _____ 167—58

OTHER REFERENCES

Chemical Abstracts, vol. 63, 1965, pp. 13856(g)–13857(a).

Chemical Abstracts, vol. 63, 1965, pp. 6866(h)–6867(a).

ALBERT T. MEYERS, Primary Examiner

J. D. GOLDBERG, Assistant Examiner